United States Patent
Gil et al.

(10) Patent No.: US 10,645,200 B2
(45) Date of Patent: May 5, 2020

(54) ALTERNATE ACKNOWLEDGMENT (ACK) SIGNALS IN A COALESCING TRANSMISSION CONTROL PROTOCOL/INTERNET PROTOCOL (TCP/IP) SYSTEM

(71) Applicant: QUALCOMM Incorporated, San Diego, CA (US)

(72) Inventors: Amit Gil, Zichron Yaakov (IL); Shaul Yohai Yifrach, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 15/678,531

(22) Filed: Aug. 16, 2017

(65) Prior Publication Data

US 2019/0058780 A1    Feb. 21, 2019

(51) Int. Cl.
| | |
|---|---|
| *H04L 29/06* | (2006.01) |
| *H04L 1/16* | (2006.01) |
| *G06F 13/12* | (2006.01) |
| *H04L 12/801* | (2013.01) |
| *H04L 12/807* | (2013.01) |
| *H04L 12/861* | (2013.01) |

(52) U.S. Cl.
CPC .......... *H04L 69/163* (2013.01); *G06F 13/128* (2013.01); *H04L 1/1635* (2013.01); *H04L 1/1664* (2013.01); *H04L 47/193* (2013.01); *H04L 47/27* (2013.01); *H04L 49/9063* (2013.01); *H04L 69/12* (2013.01)

(58) Field of Classification Search
CPC ....... H04L 1/16; H04L 69/163; H04L 47/193; H04L 69/12; H04L 47/27; G06F 13/128
See application file for complete search history.

(56) References Cited

U.S. PATENT DOCUMENTS

| | | |
|---|---|---|
| 7,826,487 B1 | 11/2010 | Mukerji et al. |
| 2004/0258075 A1 | 12/2004 | Sidenblad et al. |

(Continued)

OTHER PUBLICATIONS

International Search Report and Written Opinion for PCT/US2018/042230, dated Oct. 22, 2018, 13 pages.

(Continued)

*Primary Examiner* — Chris Parry
*Assistant Examiner* — Steven C Nguyen
(74) *Attorney, Agent, or Firm* — Withrow & Terranova, PLLC (57) ABSTRACT

Alternate acknowledgment (ACK) signals in a coalescing Transmission Control Protocol/Internet Protocol (TCP/IP) system are disclosed. In one aspect, a network interface card (NIC) examines packet payloads, and the NIC generates an ACK signal for a sending server before sending a coalesced packet to an internal processor. Further, the NIC may examine incoming packets and send an ACK signal to the internal processor for ACK signals that are received from the sending server before sending the coalesced packet to the internal processor. By extracting and sending the ACK signals before sending the corresponding payloads in the coalesced packet, latency that would otherwise be incurred waiting for the ACK signal is eliminated. Elimination of such latency may improve network performance and may provide power savings.

15 Claims, 6 Drawing Sheets

(56) References Cited

U.S. PATENT DOCUMENTS

| | | | |
|---|---|---|---|
| 2006/0104303 A1* | 5/2006 | Makineni | H04L 69/16 |
| | | | 370/463 |
| 2007/0022212 A1 | 1/2007 | Fan | |
| 2007/0064737 A1 | 3/2007 | Williams | |
| 2007/0091894 A1* | 4/2007 | Kang | H04L 1/1664 |
| | | | 370/394 |
| 2007/0118665 A1 | 5/2007 | Philbrick et al. | |
| 2010/0183024 A1 | 7/2010 | Gupta | |
| 2011/0103379 A1* | 5/2011 | Kim | H04L 1/1664 |
| | | | 370/389 |
| 2013/0205037 A1 | 8/2013 | Biswas | |
| 2017/0033992 A1* | 2/2017 | Dichtel | H04L 12/4633 |
| 2017/0064051 A1 | 3/2017 | Steinmacher-Burow | |

OTHER PUBLICATIONS

Menon, Aravind et al., "Optimizing TCP Receive Performance," USENIX Annual Technical Conference, USENIX Association, 2008, pp. 85-98.

\* cited by examiner

ALTERNATE ACKNOWLEDGMENT (ACK) SIGNALS IN A COALESCING TRANSMISSION CONTROL PROTOCOL/INTERNET PROTOCOL (TCP/IP) SYSTEM

BACKGROUND

I. Field of the Disclosure

The technology of the disclosure relates generally to signaling in a Transmission Control Protocol/Internet Protocol (TCP/IP) network between a server and a client and more particularly to coalesced signaling in a TCP/IP network.

II. Background

Computers have become common in contemporary society. The ability to communicate from one computer to another computer is part of why computing devices have proliferated. While there are various communication protocols, many of these communication protocols rely on some version of the open systems interconnection (OSI) model seven-layer communication protocol. One common variant of the OSI model is the Transmission Control Protocol/Internet Protocol (TCP/IP), which is a four-layer protocol that merges the data link and physical layers of the OSI model into a network interface layer and merges the application, presentation, and session layers of the OSI model into a single application layer.

TCP/IP is a robust communication protocol that sends packets from one point to a destination and receives an acknowledgment (ACK) packet from the destination to show that the message was received. If an ACK is not timely received, the first point may resend the packet.

The duration in which an ACK may be timely received is sometimes referred to as a TCP window. If the TCP window is too short relative to the link distance, packets may be retransmitted needlessly, which may result in network congestion and potentially in excess power consumption. If the TCP window is too long, the network may experience unnecessary latency delays as the packet source delays sending a subsequent packet until receiving an ACK. Likewise, long TCP windows may result in excessive memory usage and delays in processing the ACK signals. Such delays may have a direct impact on performance.

Independent of concerns about properly-sized TCP windows, there are concerns about traffic on internal buses. Specifically, each packet may be sent from a network interface card (NIC) to an internal processor through an internal system bus. Likewise, each such packet sent on the internal system bus may generate an ACK packet, which also travels across the internal system bus from the internal processor to the NIC. To reduce such traffic, the concept of packet coalescing has been introduced. In packet coalescing, a plurality of (e.g., three) packets are combined at the NIC and sent as a single super-packet over the internal system bus to the internal processor. Likewise, a single ACK relating to all of the plurality of packets is returned from the processor to the NIC for transmission back to the originating entity. Such consolidated ACK signaling introduces additional latency between packet origination and ACK receipt, which in turn necessitates a larger TCP window. As noted above, an improperly-sized TCP window may create other issues for the system. Accordingly, there is a need for a better way to handle ACK signals in a coalescing TCP/IP system.

SUMMARY OF THE DISCLOSURE

Aspects disclosed in the detailed description include alternate acknowledgment (ACK) signals in a coalescing Transmission Control Protocol/Internet Protocol (TCP/IP) system. Exemplary aspects of the present disclosure contemplate examination of packet payloads at a network interface card (NIC) and generating an ACK signal for a sending server before sending a coalesced packet to an internal processor. Further exemplary aspects of the present disclosure contemplate examination of packet payloads at the NIC and sending an ACK signal to the internal processor for ACK signals that are received from the sending server before sending the coalesced packet to the internal processor. By extracting and sending the ACK signals before sending the corresponding payloads in the coalesced packet, latency that would otherwise be incurred waiting for the ACK signal is eliminated. Elimination of such latency may improve network performance and may provide power savings.

In this regard in one aspect, a method for handling ACK signals in a coalescing environment is disclosed. The method includes receiving a packet including a piggyback ACK at a NIC. The method also includes, before coalescing the packet, extracting the piggyback ACK. The method also includes, before coalescing the packet, sending the piggyback ACK to a processor as a downlink (DL) ACK. The method also includes subsequently coalescing the packet with at least a second packet received at the NIC.

In another aspect, a NIC is disclosed. The NIC includes a DL interface configured to transmit and receive packets with a processor. The NIC also includes an uplink (UL) interface configured to transmit and receive packets with a remote server. The NIC also includes a control system. The control system is configured to receive a packet including a piggyback ACK through the UL interface. The control system is also configured to, before coalescing the packet, extract the piggyback ACK. The control system is also configured to, before coalescing the packet, send the piggyback ACK to the processor as a DL ACK through the DL interface. The control system is also configured to subsequently coalesce the packet with at least a second packet received through the UL interface.

In another aspect, a system using a packet aggregation algorithm to aggregate packets sent from a remote server to a local processor is disclosed. The system includes a NIC. The NIC is configured to preemptively pull piggyback ACKs out of packets returned to the NIC from a remote server. The NIC is also configured to send the piggyback ACKs to a local processor before payloads of the packets are coalesced and sent to the local processor.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include alternate acknowledgment (ACK) signals in a coalescing Transmission Control Protocol/Internet Protocol (TCP/IP) system. Exemplary aspects of the present disclosure contemplate examination of packet payloads at a network interface card (NIC) and generating an ACK signal for a sending server before sending a coalesced packet to an internal processor. Further exemplary aspects of the present disclosure contemplate examination of packet payloads at the NIC and sending an ACK signal to the internal processor for ACK signals that are received from the sending server before sending the coalesced packet to the internal processor. By extracting and sending the ACK signals before sending the corresponding payloads in the coalesced packet, latency that would otherwise be incurred waiting for the ACK signal is eliminated. Elimination of such latency may improve network performance and may provide power savings.

Figure 1:
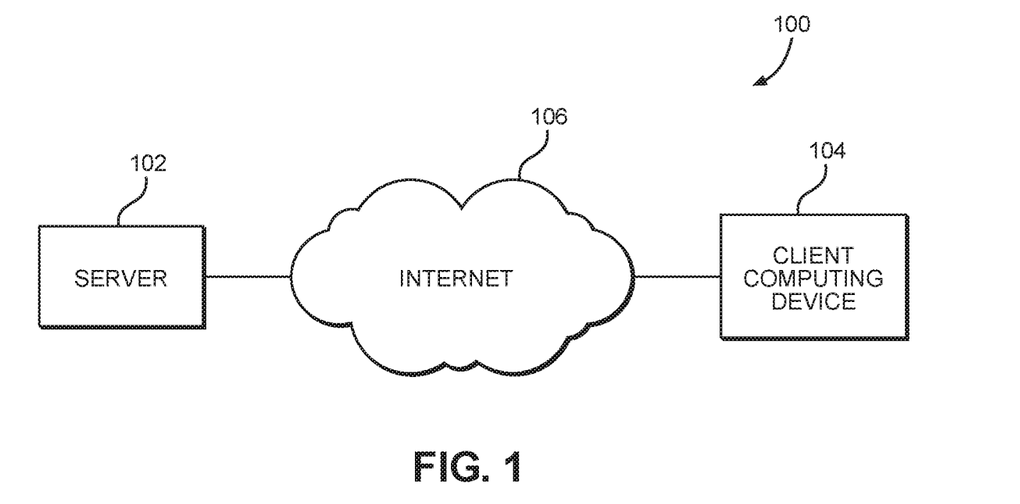
FIG. 1 is a block diagram of an exemplary computer network that may support Transmission Control Protocol/Internet Protocol (TCP/IP) communication.
Figure 2:
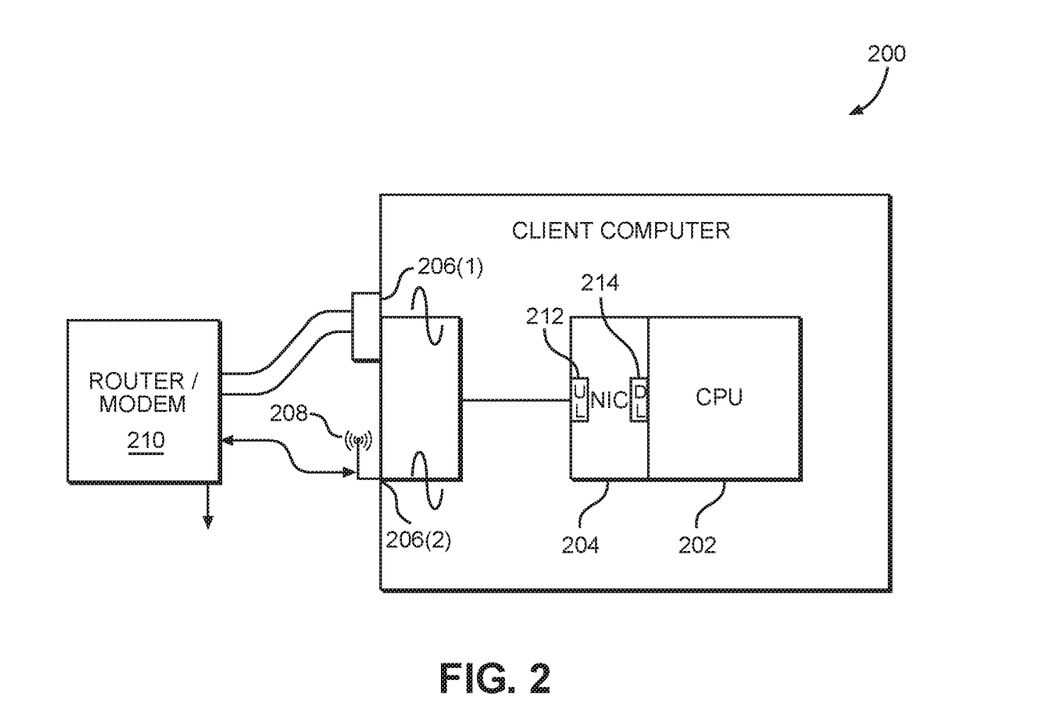
FIG. 2 is a block diagram of a computing device that may include a network interface card (NIC) that uses TCP/IP communication.
Figure 3:
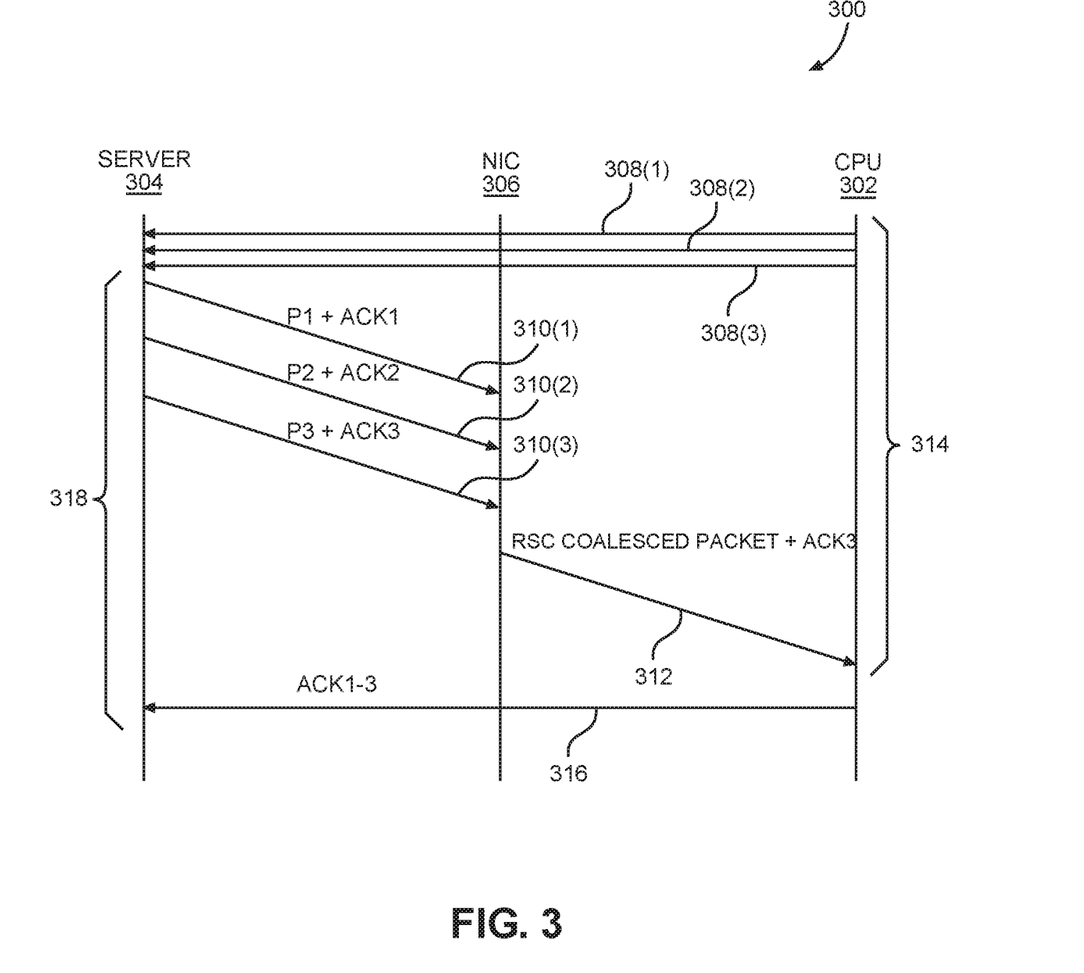
FIG. 3 is a signal flow diagram of a conventional packet signal flow using a coalescing process.

Before addressing the particulars of how ACK signals are handled, a brief overview of a computing network and computing system are provided with reference to FIGS. 1 and 2. FIG. 3 illustrates how ACK signals are currently handled in a packet coalescing system. A discussion of exemplary aspects of the alternate ACK signals in a coalescing TCP/IP system begins below with reference to FIG. 4. In this regard, FIG. 1 is a simplified block diagram of a computing network 100 with a server 102 coupled to a client computing device 104 through a network 106 such as the Internet. While illustrated as a single cloud, it should be appreciated that the network 106 could instead be a plurality of networks such as the public switched telephone network (PSTN), the public land mobile network (PLMN), and the more traditional Internet. Likewise, the server 102 could be almost any type of computing device such as a website host, an email server, an audio file repository, or the like. Similarly, the client computing device 104 can be a desktop computer, a laptop computer, a mobile computing device, or the like. It should also be appreciated that both the server 102 and the client computing device 104 may initiate packet signals that cause content, data, or instructions to be sent from the other device, and thus the server 102 and the client computing device 104 are labels of convenience and not strictly limited to traditional roles associated with such labels. Thus, in some aspects, the server 102 may be referred to as a first computing device and the client computing device 104 may be referred to as a second computing device or simply computing device.

FIG. 2 illustrates a simplified block diagram of a computing device 200. It should be appreciated that the computing device 200 may be the server 102 or the client computing device 104 of FIG. 1. The computing device 200 may include a processor 202 (sometimes referred to as a central processing unit (CPU)) and a NIC 204. In a first exemplary aspect, the processor 202 and the NIC 204 are instantiated in a single integrated circuit (IC) such as a system on a chip (SoC). In a second exemplary aspect, the processor 202 and the NIC 204 are instantiated on separate ICs with appropriate interconnects providing communication paths therebetween. The NIC 204 is communicatively coupled to signal inputs 206(1) and 206(2). Signal input 206(1) is a wire input such as an Ethernet jack. Signal input 206(2) is a wireless input, such as an antenna 208 and appropriate transceiver circuitry. For example, the signal input 206(2) could send and receive Wi-Fi or BLUETOOTH signals with TCP/IP packets therein. The signal inputs 206(1)-206(2) communicate through a router or modem 210 with the network 106 of FIG. 1. In some cases, it is possible that the router or modem 210 is in the computing device 200. While it should be understood, the NIC 204 includes an uplink (UL) interface 212 configured to transmit and receive packets with the server 102 through the router or modem 210 and a downlink (DL) interface 214 configured to transmit and receive packets with the processor 202.

Conventional servers and clients may communicate with TCP/IP. It should be appreciated that TCP/IP packets may be embedded in other protocol packets and/or carried through non-TCP/IP networks (e.g., tunneling). An ACK signal is a critical piece of TCP/IP operation to provide reliability and flow control. Accordingly, ACK signals may have a significant impact on throughput. Specifically, TCP/IP operates in a window mode (i.e., a TCP window). That is, data is sent until a "window" of ACK is met. If ACK signals are delayed, then throughput is throttled. Further, if no ACK is received, then a packet may be resent, which may contribute to unnecessary network congestion, which may also affect throughput. One technique that has been used to reduce the load on the receiver side software is receive side coalescing (RSC). RSC is a hardware algorithm that concatenates TCP/IP packets and offloads CPU processing. Similar methodology is used for other coalescing algorithms such as large receive offload (LRO) or generic receive offload (GRO). When RSC or other coalescing system is used, sending ACK signals is delayed in at least two instances. The signal flows and delays are illustrated for a conventional system in FIG. 3.

In this regard, FIG. 3 illustrates a signal flow diagram 300 for packets passing between a CPU 302 and a server 304 though a NIC 306. As illustrated, the CPU 302 initially sends three signals 308(1)-308(3) to the server 304. While three signals are illustrated, it should be appreciated that more or fewer signals may be sent. The server 304 then sends data responsive to the first signal 308(1) in the form of a signal 310(1) having a payload 1 (P1) and a piggyback ACK (ACK 1); data responsive to the second signal 308(2) in the form a signal 310(2) having a payload 2 (P2) and a second piggyback ACK (ACK 2); and data responsive to the third signal 308(3) in the form of a signal 310(3) having a payload 3 (P3) and a third piggyback ACK (ACK 3). The NIC 306 performs RSC and concatenates the payloads into a single coalesced packet 312 and at least ACK 3 (although fewer ACKs may be sent). At this point the CPU 302 closes TCP window 314 because the CPU 302 has received necessary and sufficient ACK signals to satisfy the CPU 302 that the signals 308(1)-308(3) were received. The CPU 302 then sends a coalesced ACK signal 316 to the server 304 to acknowledge receipt of the signals 310(1)-310(3). The server 304 may now close TCP window 318 because the ACKs for the signals 310(1)-310(3) have been received with the coalesced ACK signal 316. The TCP windows 314 and 318 may need to be relatively long to avoid inadvertently resending packets. However, the long TCP windows 314 and 318 may consume more power and may add latency to the system.

Figure 4:
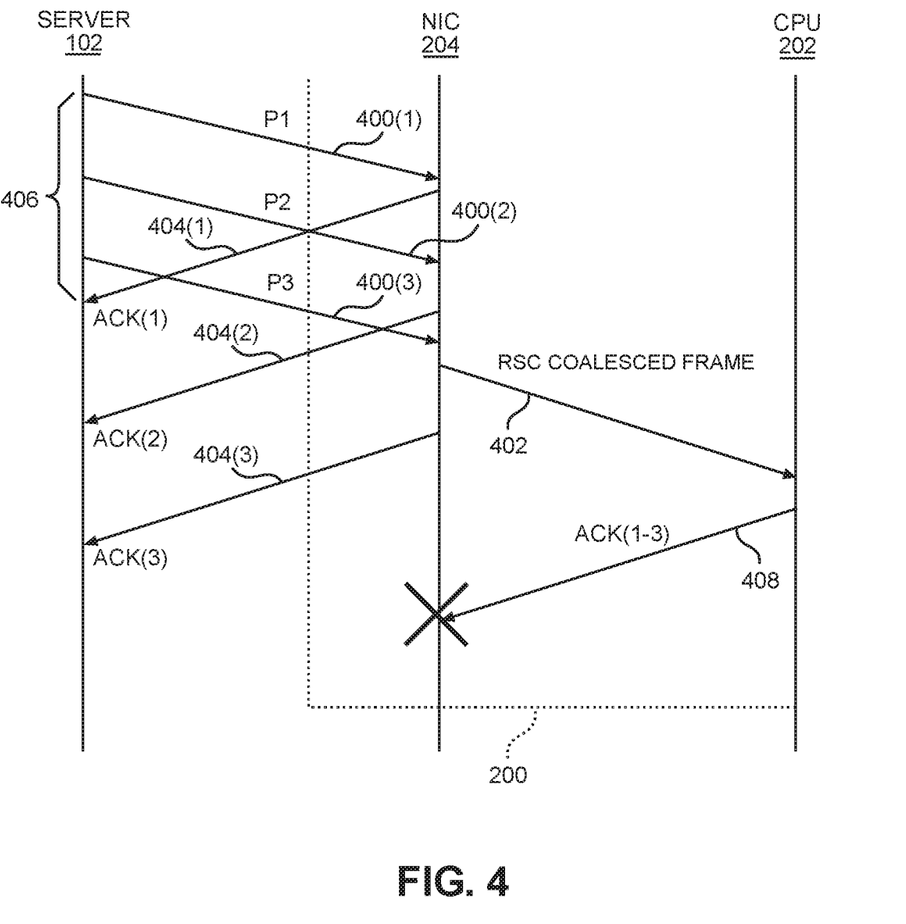
FIG. 4 is a signal flow diagram of packet signal flows where acknowledgment (ACK) signals are sent to an originating server before a coalesced packet is sent to an internal processor according to a first exemplary aspect of the present disclosure.

Exemplary aspects of the present disclosure avoid the possible latency of the signal flow diagram 300 by preemptively extracting and sending at least some of the ACK signals before coalescing is finished. In a first exemplary aspect, the ACK signals are sent from the NIC to the server before the NIC sends the coalesced packet to the processor. In this regard, FIG. 4 illustrates the signal flows passing between the computing device 200 of FIG. 2 and the server 102 of FIG. 1. In particular, the server 102 sends data signals 400(1)-400(3) to the computing device 200. Software configures the NIC 204 to perform RSC. In particular, the software indicates which connections will be coalesced and provides the hardware of the NIC 204 the parameters for generation of ACK signals. The computing device 200 receives the data signals 400(1)-400(3) at the NIC 204 and begins performing coalescing operations. Specifically, the payloads of the data signals 400(1)-400(3) are concatenated into a single RSC frame 402 to be sent to the CPU 202. The RSC frame 402 may include any RSC parameters. While not illustrated, the payloads are stored in local memory (i.e., local random access memory (RAM) or registers) until the RSC frame 402 is ready to send. However, before the RSC frame 402 is sent to the CPU 202, at least one ACK signal 404(1) is sent from the NIC 204 to the server 102. By sending the ACK signal 404(1) before the RSC frame 402 is sent to the CPU 202, TCP window 406 does not need to be excessively long. Likewise, the NIC 204 sends ACK signal 404(2) before the RSC frame 402 is sent to the CPU 202, and again the server 102 may close the TCP window 406 earlier than if the server 102 had to wait for a consolidated ACK signal (e.g., the coalesced ACK signal 316 of FIG. 3). ACK signal 404(3) is shown being sent after the RSC frame 402. It should be appreciated that all the ACK signals for a corresponding RSC frame 402 (i.e., any ACK signal that represents a payload included in the RSC frame 402) may be sent before the RSC frame 402 is sent or, as illustrated, one or more ACK signals (e.g., 404(3)) may be sent after the RSC frame 402 is sent to the CPU 202. Even in such situation where the ACK signal is sent after the RSC frame 402, such subsequent ACK signals are sent before a consolidated ACK signal 408 is returned from the CPU 202 to the NIC 204. In either event, the NIC 204 will indicate within the RSC frame 402 information about which ACK signals have been sent. Further, because the NIC 204 has already sent ACK signals to the server 102, the arrival of the consolidated ACK signal 408 does not trigger generation of a consolidated ACK signal to the server 102.

In the case of LRO or GRO, the NIC 204 may send a tag to help with the coalescing. It should be appreciated that LRO may use more processing on the local CPU side to construct a valid coalesced TCP/IP packet as opposed to RSC which may generally talk directly to the network stack. GRO is generally considered to be a software implementation of RSC with some limitations. Exemplary aspects of the present disclosure work with RSC, LRO, and GRO.

Figure 5:
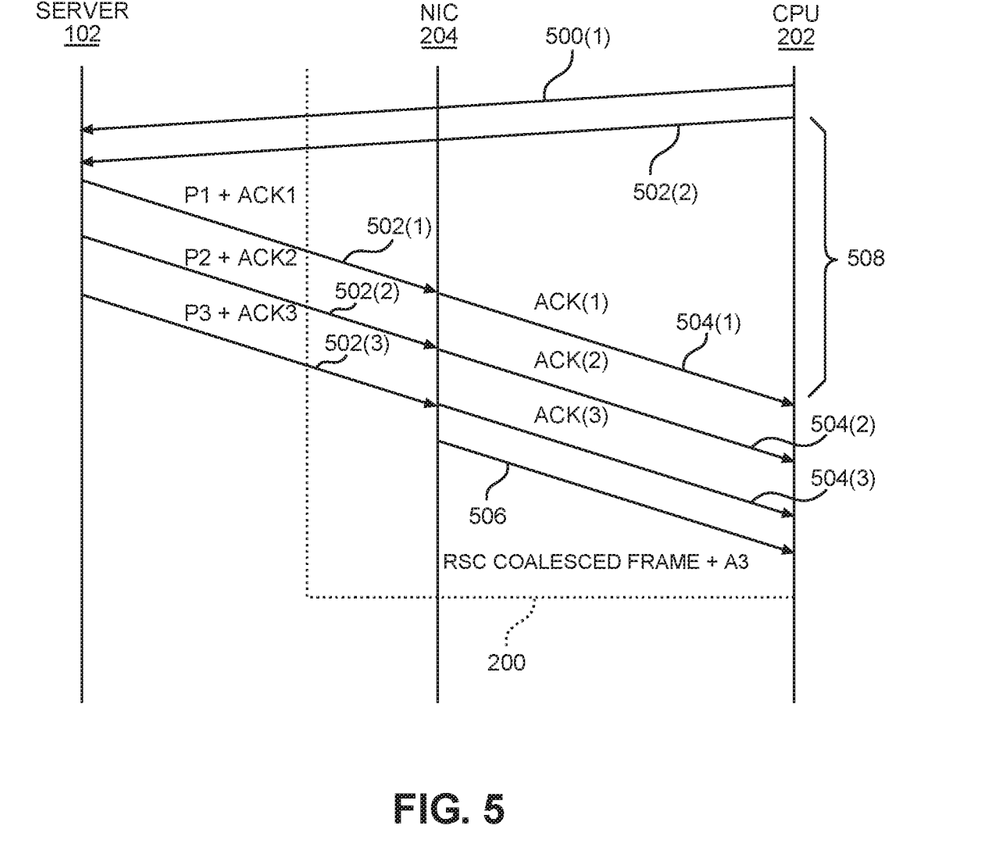
FIG. 5 is a signal flow diagram of packet signal flows where ACK signals are sent to an internal processor before a coalesced packet is sent to the internal processor according to an alternate exemplary aspect of the present disclosure.

There is also an additional opportunity to send ACK signals to help reduce TCP windows. In particular, the ACK signals may be sent to the CPU for packets responsive to CPU generated signals. FIG. 5 illustrates the signal flows for this situation. The CPU 202 sends an initial signal 500(1) (and/or a second signal 500(2)) to the server 102 through the NIC 204. The server 102 receives the signals 500(1) and 500(2) and sends responsive signals 502(1)-502(3). Each of the responsive signals 502(1)-502(3) may include a piggyback ACK in addition to the payload. Alternatively, each of the responsive signals 502(1)-502(3) may be just an ACK signal. In either event, the ACK signal from the server 102 tells the CPU 202 that the server 102 received the signals 500(1) and 500(2) from the CPU 202. When the responsive signals 502(1)-502(3) arrive at the NIC 204, the NIC 204 begins coalescing the payloads therein. While concatenating the payloads, the NIC 204 sends ACK signals 504(1)-504(3) corresponding to the ACK signals in the responsive signals 502(1)-502(3) to the CPU 202 before sending RSC coalesced frame 506 to the CPU 202. By pre-emptively sending the ACK signals 504(1)-504(3) to the CPU 202, TCP window 508 may be kept relatively small, especially in comparison to the window that would be required if the CPU 202 had to wait for the arrival of the RSC coalesced frame 506.

Figure 6:
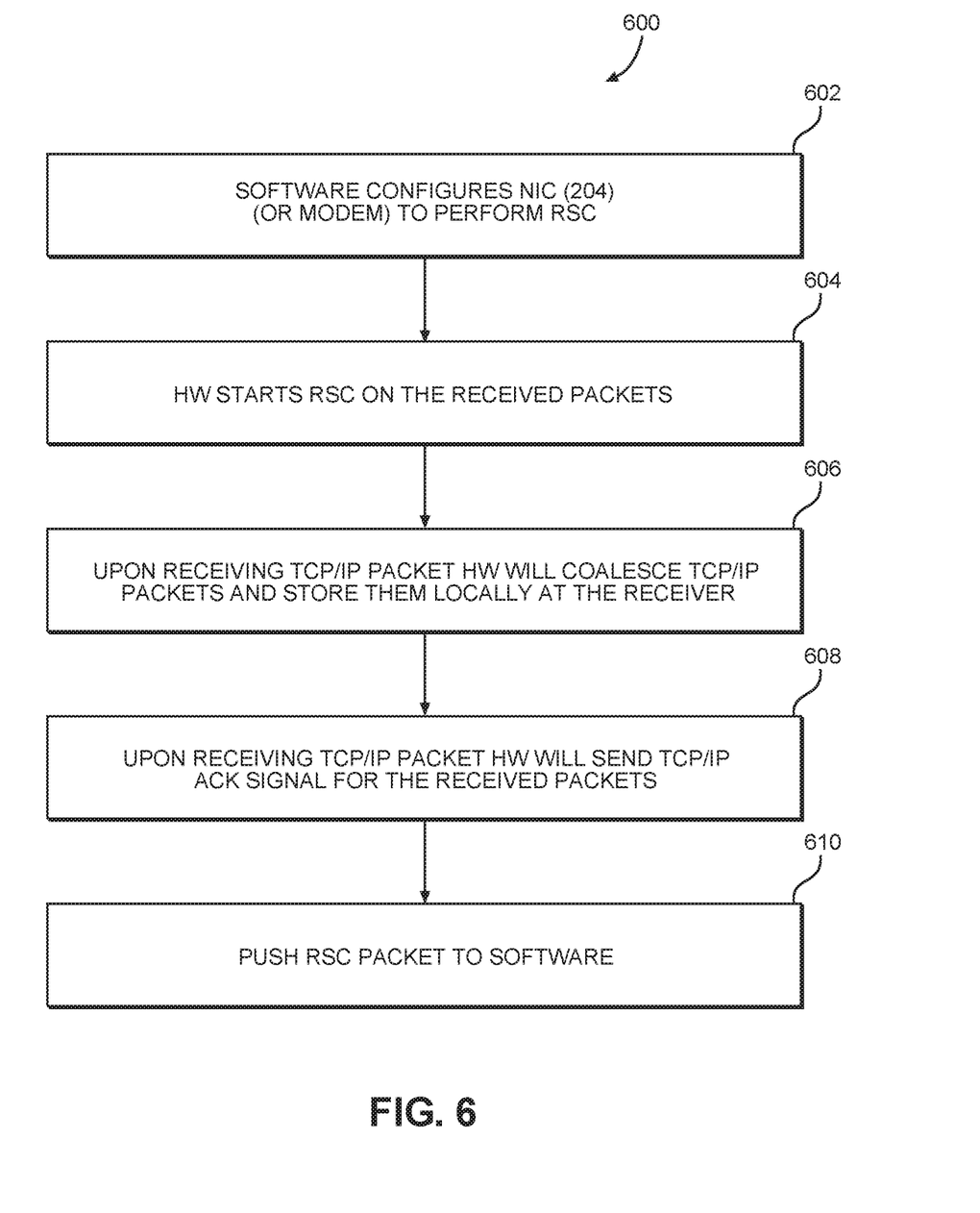
FIG. 6 is a flowchart illustrating an exemplary process for pre-emptively sending ACK signals before sending a coalesced packet according to exemplary aspects of the present disclosure.

Implicit in the discussion above is a process for providing the alternate ACK signals in a coalescing system. A more explicit illustration of such a process is provided in FIG. 6, where a process 600 begins with software of the computing device 200 configuring the NIC 204 (or modem) to perform RSC (block 602). Such configuration includes indicating what connections will be coalesced and providing the NIC 204 with parameters for generation of the ACK signals (i.e., will the ACK signals be sent to the server 102 or to the CPU 202 (or both)). The hardware (i.e., the NIC 204) begins receiving packets (e.g., 502(1)-502(3)) and starts RSC on the received packets (block 604). Upon receiving a TCP/IP packet, the hardware will coalesce TCP/IP packets 502(1)-502(3) and store them locally (block 606). Further the hardware will send a TCP/IP ACK signal for the received packets (block 608). That is, the NIC 204 will send an uplink (UL) ACK signal (e.g., 404(1)-404(3)) to the server 102 and/or send a downlink (DL) ACK signal (e.g., 504(1)-504(3)) to the CPU 202 before sending a coalesced frame 506. After sending at least one pre-emptive ACK signal, the hardware will push the RSC packet to the software and thus to the CPU 202 (block 610).

The alternate ACK signals in a coalescing TCP/IP system according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
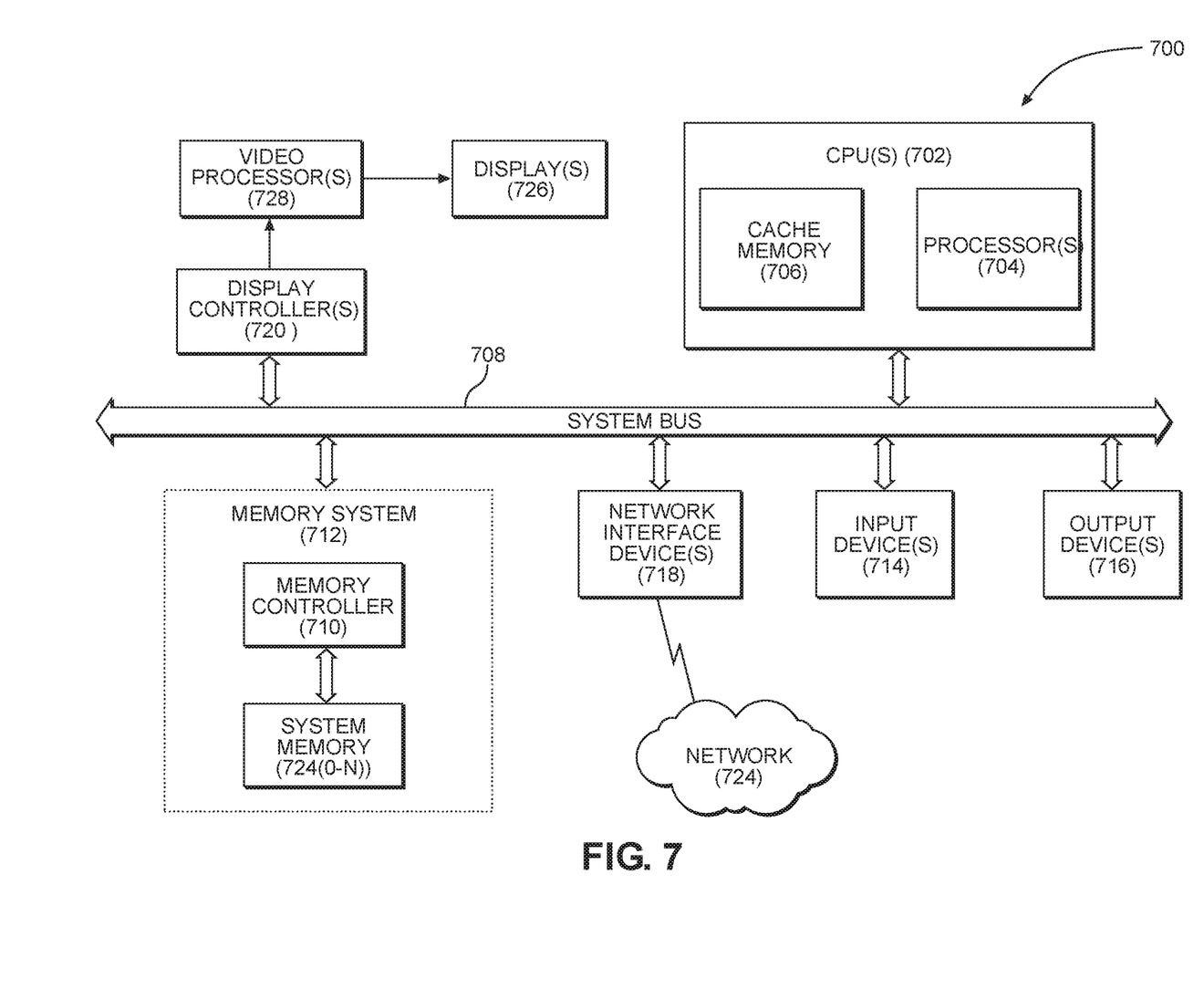
FIG. 7 is a block diagram of an exemplary processor-based system that can include pre-emptive ACK signals in a coalescing TCP/IP system of FIG. 2.

In this regard, FIG. 7 illustrates an example of a processor-based system 700 that can employ pre-emptive ACK signals in a coalescing TCP/IP system such as the computing device 200 illustrated in FIG. 2. In this example, the processor-based system 700 includes one or more CPUs 702, each including one or more processors 704. The CPU(s) 702 may be the CPU 202. The CPU(s) 702 may have cache memory 706 coupled to the processor(s) 704 for rapid access to temporarily stored data. The CPU(s) 702 is coupled to a system bus 708 and can intercouple master and slave devices included in the processor-based system 700. As is well known, the CPU(s) 702 communicates with these other devices by exchanging address, control, and data information over the system bus 708. For example, the CPU(s) 702 can communicate bus transaction requests to a memory controller 710 as an example of a slave device. Although not illustrated in FIG. 7, multiple system buses 708 could be provided, wherein each system bus 708 constitutes a different fabric.

Other master and slave devices can be connected to the system bus 708. As illustrated in FIG. 7, these devices can include a memory system 712, one or more input devices 714, one or more output devices 716, one or more network interface devices 718, and one or more display controllers 720, as examples. The input device(s) 714 can include any type of input device, including, but not limited to, input keys, switches, voice processors, etc. The output device(s) 716 can include any type of output device, including, but not limited to, audio, video, other visual indicators, etc. The network interface device(s) 718 can be any devices configured to allow exchange of data to and from a network 722. The network 722 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 718 can be configured to support any type of communications protocol desired. The memory system 712 can include one or more memory units 724(0-N).

The CPU(s) 702 may also be configured to access the display controller(s) 720 over the system bus 708 to control information sent to one or more displays 726. The display controller(s) 720 sends information to the display(s) 726 to be displayed via one or more video processors 728, which process the information to be displayed into a format suitable for the display(s) 726. The display(s) 726 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for handling acknowledgment (ACK) signals in a coalescing environment, comprising:
   receiving a plurality of packets each including a respective piggyback ACK at a network interface card (NIC);
   before coalescing the plurality of packets, extracting the respective piggyback ACKs to form a plurality of piggyback ACKs;
   before coalescing the plurality of packets, sending the plurality of piggyback ACKs to a processor as downlink (DL) ACKs; and
   subsequently coalescing the plurality of packets,
   wherein the method further comprises sending an initial request packet from the processor to a remote server through the NIC which causes the remote server to generate the plurality of packets including the plurality of piggyback ACKs.

2. The method of claim 1, further comprising sending an uplink (UL) ACK to the remote server in response to receiving the plurality of packets and before coalescing the plurality of packets.

3. The method of claim 1, wherein the coalescing comprises coalescing using large receive offload (LRO) or generic receive offload (GRO).

4. The method of claim 1, wherein the coalescing comprises coalescing using receive side coalescing (RSC).

5. The method of claim 1, further comprising sending coalesced packets to the processor.

6. The method of claim 5, wherein sending the coalesced packets to the processor comprises sending the coalesced packets to a processor within an integrated circuit (IC) that also includes the NIC.

7. A network interface card (NIC), comprising:
   a downlink (DL) interface configured to transmit and receive packets with a processor;
   an uplink (UL) interface configured to transmit and receive packets with a remote server; and
   a control system configured to:
     receive a plurality of packets each including a respective piggyback acknowledgment (ACK) through the UL interface;
     before coalescing the plurality of packets, extract the respective piggyback ACKs to form a plurality of piggyback ACKs;
     before coalescing the plurality of packets, send the plurality of piggyback ACKs to the processor as DL ACKs through the DL interface; and
     subsequently coalesce the plurality of packets,
   wherein the control system is further configured to send an initial request packet from the processor to the remote server which causes the remote server to generate the plurality of packets including the plurality of piggyback ACKs.

8. The NIC of claim 7, wherein the control system is further configured to send a UL ACK to the remote server in response to receiving the plurality of packets and before coalescing the plurality of packets.

9. The NIC of claim 7, wherein the control system is configured to coalesce using large receive offload (LRO) or generic receive offload (GRO).

10. The NIC of claim 7, wherein the control system is configured to coalesce using receive side coalescing (RSC).

11. The NIC of claim 7, wherein the control system is further configured to send coalesced packets to the processor.

12. The NIC of claim 7, wherein the processor and the NIC are integrated into a single integrated circuit (IC).

13. The NIC of claim 7, wherein the processor and the NIC are located on distinct and separate integrated circuits (ICs).

14. The NIC of claim 7 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

15. A system using a packet aggregation algorithm to aggregate packets sent from a remote server to a local processor, the system comprising:
   a network interface card (NIC) configured to:
     preemptively pull a plurality of piggyback acknowledgments (ACKs) out of the packets returned to the NIC from the remote server; and
     send the plurality of piggyback ACKs to the local processor before payloads of the packets are coalesced and sent to the local processor,
   wherein the NIC is further configure to send an initial request packet from the local processor to the remote server which causes the remote server to generate the packets including the plurality of piggyback ACKs.

* * * * *